US006339770B1

(12) United States Patent
Leung et al.

(10) Patent No.: US 6,339,770 B1
(45) Date of Patent: Jan. 15, 2002

(54) QUERY SIMPLIFICATION AND OPTIMIZATION INVOLVING ELIMINATING GROUPING COLUMN FROM GROUP BY OPERATION CORRESPONDS TO GROUP BY ITEM THAT IS CONSTANT

(75) Inventors: Ting Yu Leung; Mir Hamid Pirahesh, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/373,924

(22) Filed: Aug. 12, 1999

(51) Int. Cl.[7] .............................................. G06F 17/30

(52) U.S. Cl. ...................... 707/2; 707/3; 707/5; 707/7; 707/102

(58) Field of Search ...................... 707/1–7, 100–104

(56) References Cited

U.S. PATENT DOCUMENTS

| | | | | |
|---|---|---|---|---|
| 5,590,324 A | * | 12/1996 | Leung et al. ................... | 707/5 |
| 5,598,559 A | | 1/1997 | Chaudhuri ..................... | 707/2 |
| 5,713,020 A | * | 1/1998 | Reiter et al. ................. | 707/102 |
| 5,724,570 A | * | 3/1998 | Zeller et al. .................... | 707/3 |
| 5,761,653 A | * | 6/1998 | Schiefer et al. ................ | 707/2 |
| 5,761,657 A | * | 6/1998 | Hoang ............................ | 707/4 |
| 5,781,896 A | * | 7/1998 | Dalal ............................ | 707/2 |
| 5,822,750 A | * | 10/1998 | Jou et al. ....................... | 707/2 |
| 5,832,475 A | * | 11/1998 | Agrawal et al. ............... | 707/2 |
| 5,873,075 A | * | 2/1999 | Cochrane et al. .............. | 707/2 |
| 5,884,299 A | | 3/1999 | Ramesh et al. ................ | 707/2 |
| 5,963,936 A | * | 10/1999 | Cochrane et al. ............. | 707/3 |
| 6,092,062 A | * | 7/2000 | Lohman et al. ................ | 707/2 |
| 6,112,198 A | * | 8/2000 | Lohman et al. ................ | 707/3 |
| 6,199,063 B1 | * | 3/2001 | Colby et al. ................... | 707/4 |

OTHER PUBLICATIONS

Surajit Chaudhuri et al., Including Group–By in query optimization, Proceedings of the 20th VLDB conference Santiago, Chile, 1994.*
Surajit Chaudhuri et al., Optimizing queries with Aggregate views, Advances in Database Technology–EDBT'96, 5th Internationa Conference on Extending Database Technology, Avignon, France, Mar. 25–29, 1996, proceedings.*
T.Y. Cliff Leung et al. Query Rewrite Optimization Rules in IBM DB2 Universal Database, Chapter 2, pp. 153–168, No Date Available.
H. Pirahesh et al. (1992) Extensible/Rule Based Query Rewrite Optimization in Starburst, *A CM Sigmod* pp. 39–48.
A.Y. Levy et al. (1994) Query Optimization by Predicate Move–Around, Proceedings of the $20^{th}$ VLDB Conference.
W. Yan and P. Larson (1994) Performing Group–By Before Join., Proceedings of the $10^{th}$ Int'l Conference on Data Engineering, pp. 89–100.
D. Simmen et al. (1996) Fundamental Techniques for Order Optimization, Proceedings A CM SIGMOD International Conference on Management of Data, 25(2):57–177.
L.S. Cosby et al. (1998) Red Brick Vista: Aggregate Computation and Management, Proceedings of the $14^{th}$ Int'l Conference on Data Engineering, pp. 659–664.
R. Bello et al. Materialized Views in Oracle, Proceedings of the $24^{th}$ VLDB Conference (1998).
D. Srivastava et al. (1996) Answering Queries with Aggregation Using Views, Proceedings of the $22^{nd}$ VLDB Conference, pp. 318–329.

* cited by examiner

*Primary Examiner*—Jack Choules
*Assistant Examiner*—Srirama Channavajjala
(74) *Attorney, Agent, or Firm*—Gates & Cooper LLP

(57) ABSTRACT

A method, apparatus, and article of manufacture for simplifying and optimizing queries involving GROUP BY operations, when GROUP BY items involve constants and when there are "false" predicates in SELECT-HAVING clauses.

18 Claims, 4 Drawing Sheets

QUERY SIMPLIFICATION AND OPTIMIZATION INVOLVING ELIMINATING GROUPING COLUMN FROM GROUP BY OPERATION CORRESPONDS TO GROUP BY ITEM THAT IS CONSTANT

BACKGROUND OF THE INVENTION

1. Field of the Invention

This invention relates in general to database management systems performed by computers, and in particular, to query simplification and optimization involving GROUP BY operations.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Institute (ANSI) and the International Standards Organization (ISO).

For most RDBMS software, queries involving GROUP BY operations are very common, and hence optimizing such queries becomes increasingly important. There are extensive research activities and literature on such optimizations, as disclosed in the following publications, which are incorporated by reference herein:

1. W. Yan and P. Larson. Performing Group-By Before Join. Proceedings of the 10$^{th}$ Int'l. Conference on Data Engineering, 1994.

2. D. Simmen, E. Shekita and T. Malkemus. Fundamental Techniques for Order Optimization. Proceedings ACM SIGMOD International Conference on Management of Data, June 1996.

Yan & Larson's work focused on re-ordering a group by operation with joins. For example, it may be more efficient to perform the group by operation before any joins. Simmen, Shekita & Malkemus' work focused on minimizing the sort requirements for complex SQL including group by operations.

Nonetheless, there is a need in the art for more sophisticated techniques for query simplification and optimization involving GROUP BY operations.

SUMMARY OF THE INVENTION

To overcome the limitations in the prior art described above, and to overcome other limitations that will become apparent upon reading and understanding the present specification, the present invention discloses a method, apparatus, and article of manufacture for simplifying and optimizing queries involving GROUP BY operations, when GROUP BY items involve constants and when there are "false" predicates in SELECT-HAVING clauses.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

HARDWARE AND SOFTWARE ENVIRONMENT

Figure 1:
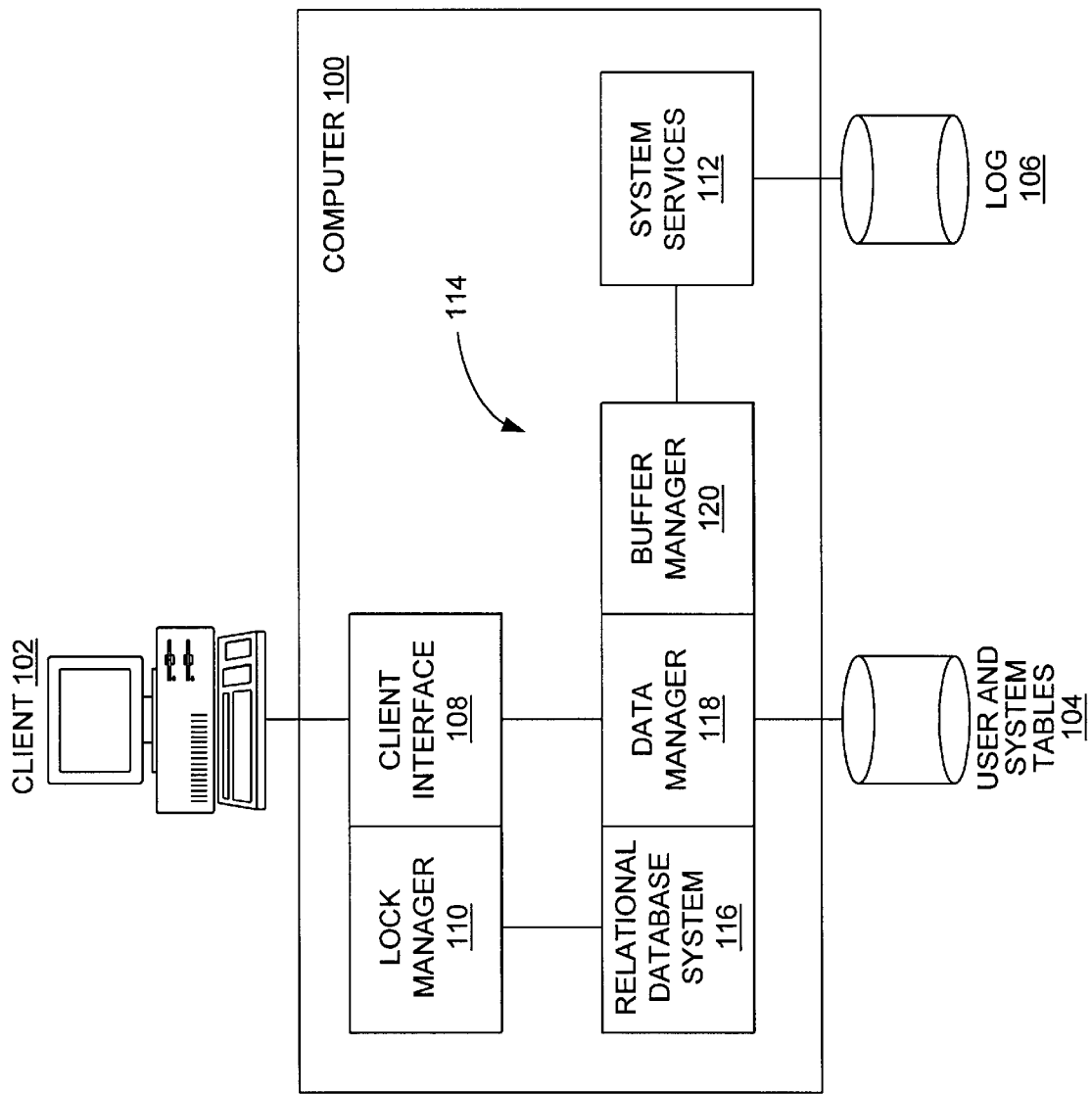
FIG. 1 illustrates the computer hardware environment of the present invention.

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) that manages user and system tables 104 and includes a system log 106. In the preferred embodiment of the present invention, the RDBMS comprises the DataBase 2 (DB2™) Universal DataBase (UDB™) product offered by IBM Corporation, although those skilled in the art will recognize that the present invention has application to any RDBMS. The client computers 102 interface to the RDBMS via a client interface component 108.

As illustrated in FIG. 1, the RDBMS includes three major components: the Resource Lock Manager (RLM 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS is the Database Services module 114. The Database Services module 114 contains several submodules, including a Relational Database System (RDS) 116, Data Manager 118, and Buffer Manager 120. The RDS 116 includes other elements such as an SQL compiler/interpreter, which supports the functions of the SQL language, i.e., definition, access control, retrieval, and update.

Generally, the RDBMS comprises logic and/or data that is embodied in or accessible from a device, medium, or carrier, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic and/or data embodied in or accessible from any device, carrier, or media.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

INTERACTIVE SQL EXECUTION

Figure 2:
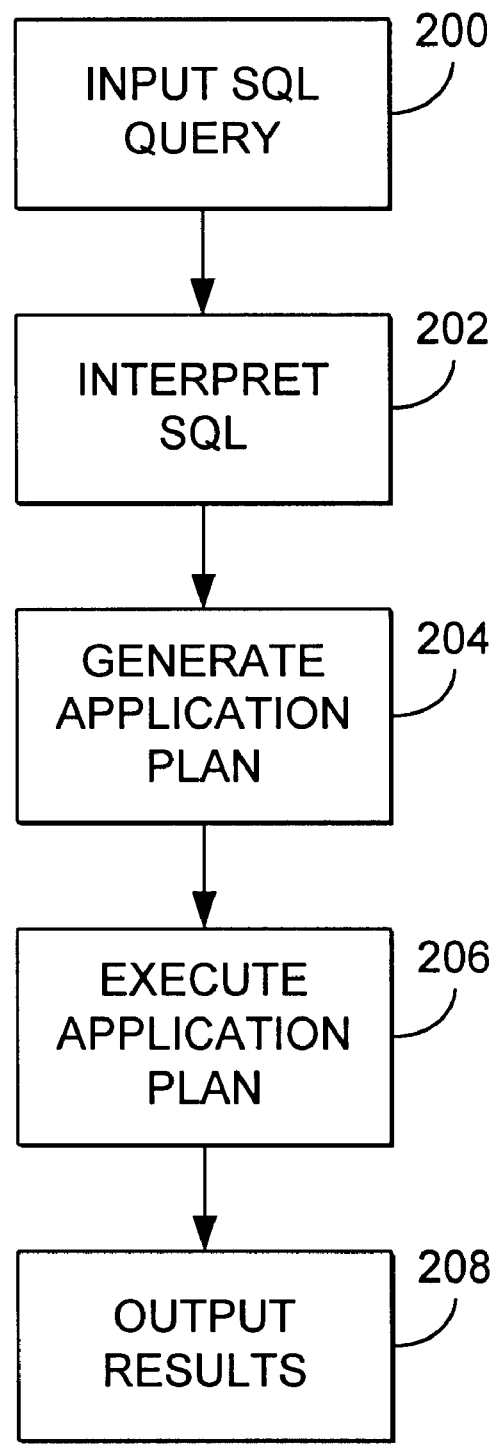
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the preferred embodiment of the present invention. Block 200 represents the input of SQL statements into the computer 100. Block 202 represents the step of compiling or interpreting the SQL statements. Block 204 represents the step of optimizing and generating a compiled set of runtime structures called an application plan from the compiled SQL statements. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. At Block 204, the RDBMS may transform or optimize the SQL query in a manner described in more detail later in this specification. Block 206 represents the execution of the application plan, and block 208 represents the output of the results.

EMBEDDED/BATCH SQL EXECUTION

Figure 3:
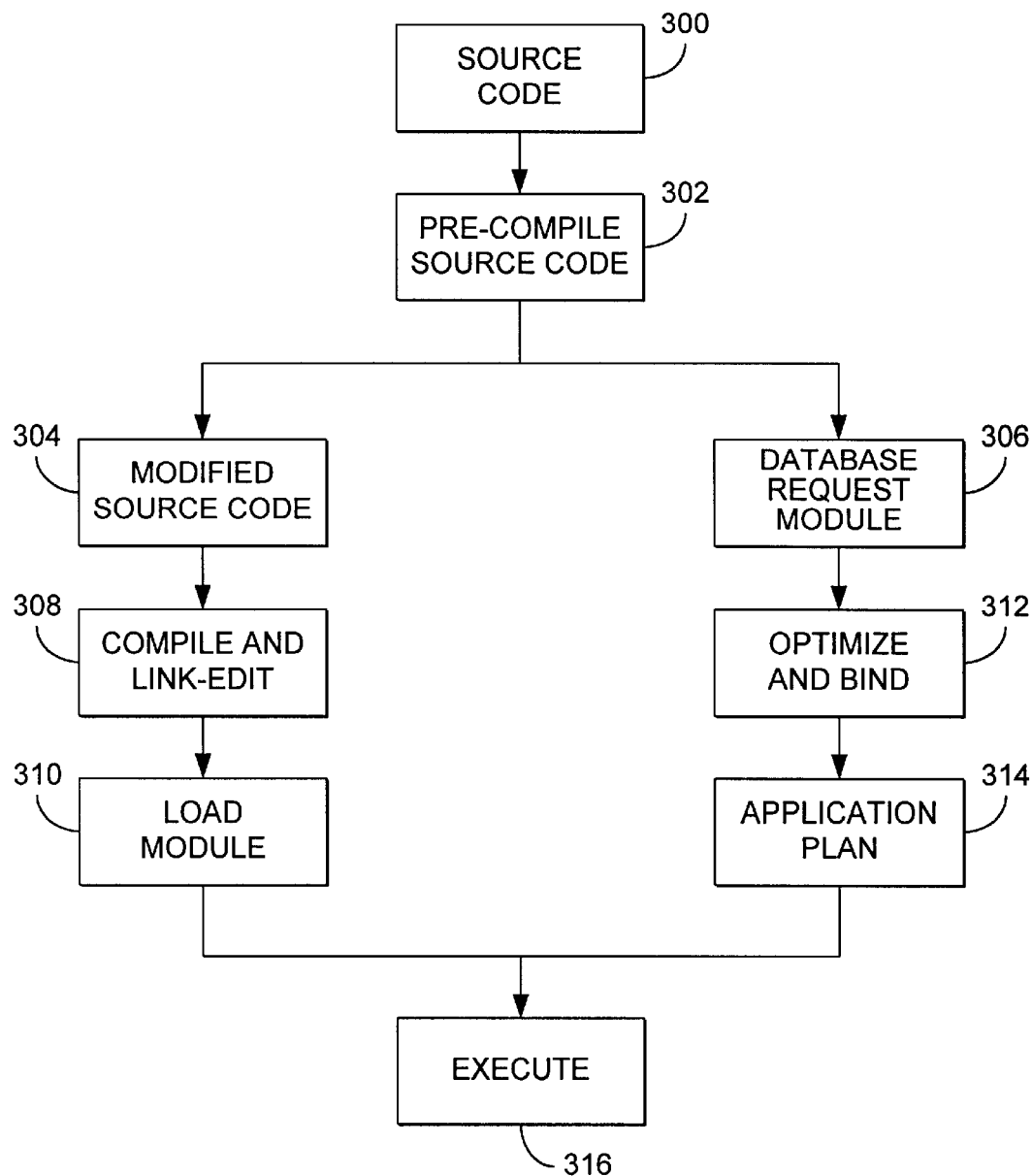
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the preferred embodiment of the present invention. Block 300 represents program source code containing a host language (such as COBOL or C) and embedded SQL statements. The program source code is then input to a pre-compile step 302. There are two outputs from the pre-compile step 302: a modified source module 304 and a Database Request Module (DBRM) 306. The modified source module 304 contains host language calls to the RDBMS, which the pre-compile step 302 inserts in place of SQL statements. The DBRM 306 is comprised of the SQL statements from the program source code 300. A compile and link-edit step 308 uses the modified source module 304 to produce a load module 310, while an optimize and bind step 312 uses the DBRM 306 to produce a compiled set of runtime structures for the application plan 314. As indicated above in conjunction with FIG. 2, the SQL statements from the program source code 300 specify only the desired data, but not how to retrieve the data. The optimize and bind step 312 may reorder or optimize the SQL query in a manner described in more detail later in this specification. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient access path for the query. The load module 310 and application plan 314 are then executed together at step 316.

DESCRIPTION OF THE OPTIMIZATION TECHNIQUE

The preferred embodiment of the present invention discloses an optimization technique that is typically performed at step 204 of FIG. 2 or step 312 of FIG. 3. Specifically, the preferred embodiment discloses a query simplification and optimization method for queries involving GROUP BY operations, particularly when there is a "false" SELECT-HAVING predicate, as well as when the GROUP BY item is a constant.

The operation of the preferred embodiment can best be understood using the following examples.

EXAMPLE 1

CREATE TABLE SALES (

SALES_ID INT,

PRODUCT_ID CHAR(3),

PURCHASE_DATE DATE,

AMOUNT FLOAT);

Consider the following query which returns the total sales from product '100' for every year:

Q:

SELECT YEAR(PURCHASE_DATE), SUM (AMOUNT)

FROM SALES

WHERE PRODUCT ID='100'

GROUP BY YEAR(PURCHASE_DATE), PRODUCT_ID

Very often, a similar query (Q1) is generated by query tools, where the false predicate "1=0" is added, so that no rows will be returned to the user, and yet the output columns and data types are preserved:

Q1:

SELECT YEAR(PURCHASE_DATE), SUM (AMOUNT)

FROM SALES

WHERE PRODUCT_ID='100'

GROUP BY YEAR(PURCHASE_DATE), PRODUCT_ID

HAVING 1=0

Such false predicates (e.g., "1=0") can generally be pushed through the GROUP BY operation, thereby resulting in the following query:

Q1':

SELECT YEAR(PURCHASE_DATE), SUM (AMOUNT)

FROM SALES

WHERE PRODUCT_ID='100' AND 1=0

GROUP BY YEAR(PURCHASE_DATE), PRODUCT_ID

The effect of such an optimization technique is that the false predicate can be applied without the RDBMS even accessing the SALES table. This technique is well-known in the art, as indicated by the following publication, which is incorporated by reference herein:

3. A. Levy, I. Mumick, Y. Sagiv. Query Optimization by Predicate Move-Around. Proceedings of the 20$^{th}$ VLDB Conference, Santiago, Chile, 1994. Pages 96–107.

In the prior art, however, predicates cannot be pushed through a GROUP BY operation when there is no GROUP BY item. This limitation can be illustrated using the following view V and query Q2.

V:

CREATE VIEW V(MAX, MIN, COUNT) AS (

SELECT MAX(AMOUNT), MIN(AMOUNT), COUNT(*) FROM SALES)

Q2:

SELECT * FROM V WHERE 1=0;

In Q2, the predicate "1=0" cannot be pushed through the query, thereby resulting in the following

Q2':
SELECT MAX(AMOUNT), MIN(AMOUNT), COUNT (*)
FROM SALES
WHERE 1=0;

The reason the predicate "1=0" cannot be pushed through the query is that the query Q2' returns one row if the SALES table is empty, whereas the original query Q2 will return no rows. The fact that the RDBMS cannot push through such false predicates results in the RDBMS accessing the SALES table, possibly by scanning the table.

The preferred embodiment of the present invention attempts to solve this problem by pushing through the predicate, as well as preserving the false predicate, to ensure the correctness of the query semantics. In simple terms, the above query can be rewritten as follows: Q2":

SELECT *
FROM TABLE (SELECT MAX(AMOUNT), MIN (AMOUNT), COUNT(*)
  FROM SALES
  WHERE 1=0) AS Q(MAX, MIN, CNT)
WHERE 1=0

By pushing the false predicate through a GROUP BY operation without a GROUP BY item, and yet preserving the original position of the false predicate, the RDBMS can enhance performance (i.e., access to the SALES table is not required), and at the same time, the query returns no rows.

EXAMPLE 2

Consider the following query which is similar to Q1:
Q3:
SELECT YEAR PURCHASE_DATE), PRODUCT_ID, SUM(AMOUNT)
FROM SALES
WHERE PRODUCT_ID='100'
GROUP BY YEAR(PURCHASE_DATE), PRODUCT_ID The query retrieves the total purchase amount for PRODUCT_ID='100' for each year. Again, this kind of query is often generated by query tools and therefore the form of query to be optimized by the RDBMS is unpredictable. In this example, the query groups on the PRODUCT_ID column, which is bound to a constant. In other words, all of the rows to be grouped will have the same column value, and for this reason, the grouping column can be eliminated from the query, thereby resulting in the following rewritten query:

Q3:
SELECT YEAR(PURCHASE_DATE), '100', SUM (AMOUNT)
FROM SALES
WHERE PRODUCT_ID='100'
GROUP BY YEAR(PURCHASE_DATE)

There are significant performance advantages to performing such query rewrites. First, the GROUP BY operation is performed on fewer columns, and thus its path length is shorter. In addition, having fewer GROUP BY items enhances query matching in the presence of materialized view optimization, as described in the following publications, all of which are incorporated by reference herein:

4. L. S. Colby, R. L. Cole, E. Haslam, N. Jazaeri, G. Johnson, W. J. McKenna, L. Schumacher, D. Wilhite. Red Brick Vista: Aggregate Computation and Management. Proceedings of the $14^{th}$ Int'l. Conference on Data Engineering, Orlando, FL, 1998.

5. R. Bello, K. Dias, A. Downing, J. Feenan, J. Finnerty, W. Norcott, H. Sun, A. Witkowski, M. Ziauddin. Materialized Views In Oracle. Proceedings of the $24^{th}$ VLDB Conference, New York, 1998.

6. D. Srivastava, S. Dar, H. Jagadish, A. Levy. Answering Queries with Aggregation Using Views. Proceedings of the $22^{nd}$ VLDB Conference, Mumbai, India, 1996.

The optimization technique of the preferred embodiment of the present invention enhances the odds of matching a query against one or more materialized views pre-built in the RDBMS, because it simplifies the query.

Finally, it can be noted that the last GROUP BY item, which is bound to a constant, cannot be eliminated. The following example, wherein the query retrieves the total purchase amount for PRODUCT_ID='100', illustrates this limitation:

Q4:
SELECT PRODUCT_ID, SUM(AMOUNT)
FROM SALES
WHERE PRODUCT_ID='100'
GROUP BY PRODUCT_ID

The above query cannot be rewritten as:
Q4':
SELECT '100', SUM(AMOUNT)
FROM SALES
WHERE PRODUCT_ID='100'

That is, the rewritten query does not have any explicit GROUP BY items. If the SALES table is empty, Q4' will return exacyly one row, whereas the original query Q4 does not return any rows.

On the other hand, to optimize Q4 further, it can be rewritten as follows:
Q4":
SELECT '100', SUM(AMOUNT)
FROM SALES
WHERE PRODUCT_ID='100'
GROUP BY 1

The rewritten query still has one GROUP BY item, although the GROUP BY item is grouping on a constant, which can be performed in a more efficient manner. Taking this optimization one step further, any GROUP BY item on constants can be converted into GROUP BY 1. For example:

Q5:
SELECT '100', SUM(AMOUNT)
FROM SALES
WHERE PRODUCT_ID='100'
GROUP BY 5 is equivalent to:
Q5':
SELECT '100', SUM(AMOUNT)
FROM SALES
WHERE PRODUCT_ID='100'
GROUP BY 1

LOGIC OF THE OPTIMIZATION TECHNIQUE

Figure 4:
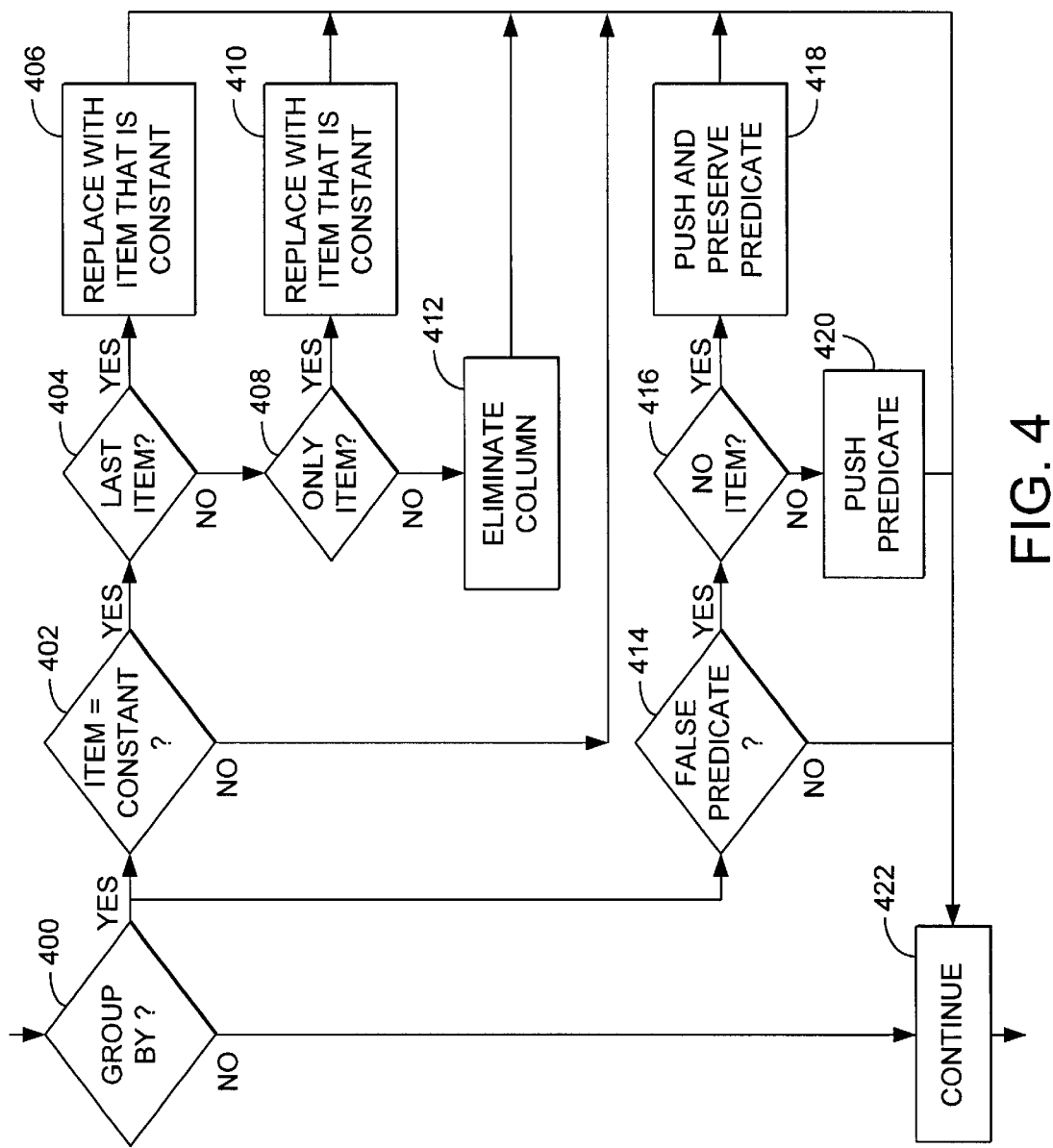
FIG. 4 is a flowchart that illustrates the method of optimizing SQL queries according to the preferred embodiment of the present invention.

FIG. 4 is a flowchart illustrating the methods of optimizing SQL queries in step 202 of FIG. 2 and step 312 of FIG. 3 according to the preferred embodiment of the present invention. Note that the term "query" as referred to herein is intended to cover any access to data, including updates, deletes, and inserts, as well as the simple retrieval of data.

Block 400 is a decision block that represents the RDBMS determining whether a GROUP BY operation exists in the query. If so, control transfers to Blocks 402 and 414 (concurrently); otherwise, control transfers to Block 422.

Block 402 is a decision block that represents the RDBMS determining whether a GROUP BY item is being compared against a constant. If so, control transfers to Block 404; otherwise, control transfers to Block 422.

Block 404 is a decision block that represents the RDBMS determining whether the GROUP BY item is the last GROUP BY item. If so, control transfers to Block 406, which replaces the GROUP BY item with a constant; otherwise, control transfers to Block 408.

Block 408 is a decision block that represents the RDBMS determining whether the GROUP BY item is the only GROUP BY item. If so, control transfers to Block 410, which replaces the GROUP BY item with a constant; otherwise, control transfers to Block 412.

Block 412 represents the RDBMS eliminating a grouping column associated with the GROUP BY item.

Block 414 is a decision block that represents the RDBMS determining whether the GROUP BY operation contains a false predicate. If so, control transfers to Block 416; otherwise, control transfers to Block 422.

Block 416 is a decision block that represents the RDBMS determining whether the GROUP BY operation has no GROUP BY items. If so, control transfers to Block 418, which represents the RDBMS pushing the false predicate through the GROUP BY operation while preserving the false predicate; otherwise, control transfers to Block 420, which represents the RDBMS pushing the false predicate through the GROUP BY operation.

Block 422 represents the RDBMS continuing its processing.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. Moreover, many types of databases could benefit from the present invention. In addition, any software program performing GROUP BY operations (or their equivalent) could benefit from the present invention.

In summary, the present invention discloses a method, apparatus, and article of manufacture for simplifying and optimizing queries involving GROUP BY operations, when GROUP BY items involve constants and when there are "false" predicates in SELECT-HAVING clauses.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of optimizing a query in a relational database management system, comprising:
   (a) analyzing the query to determine whether it contains at least one GROUP BY operation containing at least one GROUP BY item that is a constant; and
   (b) eliminating a grouping column from the GROUP BY operation that corresponds to the GROUP BY item that is a constant.

2. The method of claim 1, wherein a last one of the GROUP BY items that is bound to a constant is not eliminated.

3. The method of claim 2, wherein the last one of the GROUP BY items that is bound to a constant is eliminated and replaced with a GROUP BY item that is a constant.

4. The method of claim 1, wherein an only one of the GROUP BY items that is bound to a constant is not eliminated.

5. The method of claim 4, wherein the only one of the GROUP BY items that is bound to a constant is eliminated and replaced with a GROUP BY item that is a constant.

6. A method of optimizing a query in a relational database management system, comprising:
   (a) analyzing the query to determine whether it contains at least one GROUP BY operation without a GROUP BY item and whether it contains a false predicate to be applied after the GROUP BY operation; and
   (b) pushing the false predicate through the GROUP BY operation while preserving the false predicate, so that the false predicate can be applied by the query without accessing a table, and so that the false predicate is applied after the GROUP BY operation.

7. An apparatus for optimizing a query, comprising:
   (a) a computer; and
   (b) a relational database management system, performed by the computer, for analyzing the query to determine whether it contains at least one GROUP BY operation containing at least one GROUP BY item that is a constant, and for eliminating a grouping column from the GROUP BY operation that corresponds to the GROUP BY item that is a constant.

8. The apparatus of claim 7, wherein a last one of the GROUP BY items that is bound to a constant is not eliminated.

9. The apparatus of claim 8, wherein the last one of the GROUP BY items that is bound to a constant is eliminated and replaced with a GROUP BY item that is a constant.

10. The apparatus of claim 7, wherein an only one of the GROUP BY items that is bound to a constant is not eliminated.

11. The aparatus of claim 10, wherein the only one of the GROUP BY items that is bound to a constant is eliminated and replaced with a GROUP BY item that is a constant.

12. An apparatus for optimizing a query, comprising:
    (a) a computer; and
    (b) a relational database management system, performed by the computer, for analyzing the query to determine whether it contains at least one GROUP BY operation without a GROUP BY item and whether it contains a false predicate in a HAVING clause, and for pushing the false predicate through the GROUP BY operation while preserving the false predicate, so that the false predicate can be applied by the query without accessing a table, and so that the false predicate is applied after the GROUP BY operation.

13. An article of manufacture embodying logic for optimizing a query in a relational database management system, comprising:
    (a) analyzing the query to determine whether it contains at least one GROUP BY operation containing at least one GROUP BY item that is a constant; and
    (b) eliminating a grouping column from the GROUP BY operation that corresponds to the GROUP BY item that is a constant.

14. The method of claim 13, wherein a last one of the GROUP BY items that is bound to a constant is not eliminated.

15. The method of claim 14, wherein the last one of the GROUP BY items that is bound to a constant is eliminated and replaced with a GROUP BY item that is a constant.

16. The method of claim 13, wherein an only one of the GROUP BY items that is bound to a constant is not eliminated.

17. The method of claim 16, wherein the only one of the GROUP BY items that is bound to a constant is eliminated and replaced with a GROUP BY item that is a constant.

18. A method of optimizing a query in a relational database management system, comprising:

(a) analyzing the query to determine whether it contains at least one GROUP BY operation without a GROUP BY item and whether it contains a false predicate in a HAVING clause; and (b) pushing the false predicate through the GROUP BY operation while preserving the false predicate, so that the false predicate can be applied by the query without accessing a table, and so that the false predicate is applied after the GROUP BY operation.

* * * * *